United States Patent
Ollier et al.

(10) Patent No.: US 8,030,690 B2
(45) Date of Patent: Oct. 4, 2011

(54) DEVICE SENSITIVE TO A MOVEMENT COMPRISING AT LEAST ONE TRANSISTOR

(75) Inventors: Eric Ollier, Grenoble (FR); Laurent Duraffourg, Voiron (FR); Philippe Andreucci, Moirans (FR)

(73) Assignee: Commissariat a l'Energie Atomique, Paris (FR)

( * ) Notice: Subject to any disclaimer, the term of this patent is extended or adjusted under 35 U.S.C. 154(b) by 14 days.

(21) Appl. No.: 12/300,715

(22) PCT Filed: May 16, 2007

(86) PCT No.: PCT/EP2007/054775
§ 371 (c)(1),
(2), (4) Date: Dec. 29, 2008

(87) PCT Pub. No.: WO2007/135064
PCT Pub. Date: Nov. 29, 2007

(65) Prior Publication Data
US 2009/0321793 A1  Dec. 31, 2009

(30) Foreign Application Priority Data

May 18, 2006  (FR) ..................................... 06 51822

(51) Int. Cl.
*H01L 29/84* (2006.01)
(52) U.S. Cl. ........ 257/254; 257/417; 257/418; 257/420; 257/302
(58) Field of Classification Search .......................... None
See application file for complete search history.

(56) References Cited

U.S. PATENT DOCUMENTS

| 5,541,437 | A | * | 7/1996 | Watanabe et al. | 257/417 |
| 5,627,397 | A | * | 5/1997 | Kano et al. | 257/417 |
| 6,204,544 | B1 | * | 3/2001 | Wang et al. | 257/417 |
| 6,744,173 | B2 | * | 6/2004 | Behin et al. | 310/309 |
| 2003/0173611 | A1 | * | 9/2003 | Bertz et al. | 257/302 |
| 2004/0110362 | A1 | * | 6/2004 | Rudeck | 438/593 |
| 2005/0227428 | A1 | * | 10/2005 | Mihai et al. | 438/222 |

FOREIGN PATENT DOCUMENTS

| JP | 58-034946 A | 3/1983 |
| WO | 03-078299 A1 | 9/2003 |
| WO | WO 03078299 A1 * | 9/2003 |

OTHER PUBLICATIONS

French Search Report.
International Search Report for PCT/EP2007/054775.
Aldridge et al; "Nanoelectronic and nanomechanical systems", SPIE Proceedings, 4591, 11, 2001.
Abele et al; Electromechanical Modelling of MEMES Resonators with MOSFET Detection, NSTI Nanotech 2005 Conference, ISBN 0-9767985-2-2 vol. 3, 2005.
Buschnakowski et al; "Development and Characterisation of a High Aspect Ratio Vertical Fet Sensor for Motion Detection", Transducers, Solid-State Sensors, Actuators and Microsystems, 12th International Conference, IEEE vol. 2, Jun. 9, 2003 pp. 1391-1394.

* cited by examiner

*Primary Examiner* — Ha Tran T Nguyen
*Assistant Examiner* — Shantanu C Pathak
(74) *Attorney, Agent, or Firm* — Pearne & Gordon LLP

(57) ABSTRACT

The invention relates to a detection device using at least one transistor (2) with a vertical channel, comprising a mechanical structure (14), free to move relative to the transistor, in a plane containing the transistor drain (10), source (8) and channel (12).

20 Claims, 8 Drawing Sheets

DEVICE SENSITIVE TO A MOVEMENT COMPRISING AT LEAST ONE TRANSISTOR

TECHNICAL FIELD AND PRIOR ART

The invention relates to the field of MEMS (Micro-Electro-Mechanical-Systems) and/or NEMS (Nano-Electro Mechanical-Systems).

It also relates to the field of movement detection devices for mechanical structures, and discloses a structure for implementing a detection principle with higher performance than capacitive detection usually used in this movement detection field.

The invention is applicable to MEMS-NEMS devices, particularly of the type made on Silicon (SOI ("Silicon On Insulator"), SON ("Silicon On Nothing"), . . . ) substrates. For example these may be sensor type devices (acceleration, vibrations, gyrometer or pressure sensors, etc.) made on thin SOI substrates (for example 160 nm of SOI on 400 nm of $SiO_2$) with the objective of integrating the NEMS or MEMS device and its electronic circuit in an "in IC" integration approach.

Devices with SET (Single Electron Transistor) type transistors are described in the "Nanoelectronic and nanomechanical systems" document, J. S. Aldridge et al., SPIE Proceedings 4591,11 (2001). This type of implementation also uses NEMS type structures and SETs.

Operation of this type of component is very specific and in its current state of development is not suitable for MEMS-IC co-integration.

Existing manufacturing techniques for these SET devices are based either on the physical methods of the semiconductor technology (deposits, photolithography) or on chemical self-assembly methods.

The "physical" approach results in the devices larger than would be necessary for SETs. One consequence is the compulsory cooled operation for these components (often <1K). The "chemical" approach makes smaller sizes possible (islands measuring a few nm) but the technique is not very mature. There are also techniques using AFM, for example to form TiOx lines in a Ti layer, thus creating tunnel junctions between Ti elements (2 electrodes+one 5 nm island).

Products are usually based on metallic materials (Al, Ti, etc.) with air and oxide bands made of the same material (Al2O3, TiOx . . . ) to make the tunnel junctions. These materials are not very suitable for the production of high performance MEMS, due to their mechanical properties.

These examples show that the use of SETs leads to extreme situations that cause severe technical manufacturing difficulties not compatible in the current state of the art with good reproducibility and collective mass production. Therefore, industrialization of methods using these SETs is not currently feasible.

Finally, devices implementing SETs need to work at very low temperatures (a few mK), which is not compatible with the objective of making structures manufactured collectively at low cost.

Furthermore, the use of transistors (for example MOSFET transistors) is known for making sensors.

One of the parts of the transistor (for example the gate) is influenced by the movement of the mechanical structure, which causes a variation in the current Ids (source-drain current) of the transistor sensitive to the mechanical movement.

Thus, a FET (Field Effect Transistor) transistor of the planar type or vertical channel type can be used.

Devices with planar FET type transistors are for example described in Abele documents (2005): "Electromechanical modelling of MEMS Resonators with MOSFET detection", NSTI Nanotech 2005 Conference, ISBN 0-9767985-2-2 Vol. 3, 2005; WO 03/0 78299; U.S. Pat. Nos. 5,541,437; 6,204,544.

In these documents, the transistor current Ids is varied by a movement of the transistor gate facing the channel created between the transistor source and drain. This displacement of the gate relative to the channel induces a variation of the capacitance between the gate and the channel Cgc, therefore a variation in the field at the channel, which results in a variation of the output current Ids from the transistor.

In these documents, the gate is displaced:
either perpendicular to the chip and to the channel. In this case, the variation of the current Ids is due to a variation in the capacitance Cgc obtained by variation of the air gap between two electrodes composed of the gate and the channel,
or in a plane parallel to the plane of the chip. In this case, the variation of the current Ids is due to a variation in the capacitance Cgc obtained by variation of the surface between the two electrodes composed of the gate and the channel.

In all these embodiments, the transistor is a planar transistor made in the plane of the substrate: the plane of the channel is located in the plane of the chip close to the interface (conduction close to the interface). This conventional approach for manufacturing transistors makes it possible to work with high quality transistors (quality of the oxide/semiconductor interface).

Nevertheless, these approaches have the disadvantage of imposing the construction of mobile mechanical structures above the plane of the planar transistor, both in the case of a displacement outside the plane (perpendicular to the plane of the chip) and for displacements in the plane. In the case of displacements in the plane, the mechanical structure is displaced in a plane parallel to the plane of the channel but different from it (usually above it).

This approach leads to the MEMS structure being manufactured in supplementary layers deposited in addition to the semiconductor layer used for manufacturing the transistor (and possibly an IC circuit). This situation results in a complex technological stack, leads to the production of mechanical structures in the deposited materials (poly Si, metals, etc.) that are not mechanically optimum (material defects, stresses, etc.). Finally, these approaches introduce compatibility problems for a CMOS-MEMS integration (thermal budget, protection during release, etc.). The methods envisaged make it necessary to separate MEMS and CMOS manufacturing steps, which introduces limitations on the envisaged designs, increases the technological complexity and efficiency and manufacturing cost problems. This is the case particularly for "Above IC" approaches for which constraints in terms of efficiency at the MEMS are extreme, because it is done at the end of the process. For example, for "post-CMOS" methods in which the MEMS is made after the CMOS circuit, constraints in terms of thermal budget or constraints induced by MEMS steps are very severe to avoid deteriorating performances of the circuit. For "pre-CMOS" type methods in which the MEMS is made before the circuit, a technological assembly has to be used to protect the MEMS during manufacturing of the circuit.

Devices with vertical FET type transistors are described in the document entitled "Development and characterisation of a high aspect ratio vertical FET sensor for motion detection" Buschnakowski et al., Transducers 2003, Boston, Jun. 8-12, 2003.

This approach is useful for making the mechanical structure and electrical structure in the same plane.

Nevertheless, the particular configuration of the "vertical" transistor makes it difficult to control transistor zones (source, drain, channel) precisely, which results in non-optimum performances and reproducibility problems for this type of transistor. In this approach, distributions of doping agents for source and drain zones, in particular defining the channel length, are defined directly by implantation steps within the thickness of the silicon layer, and not by patterns originating from a photolithography step. Furthermore, this control becomes more and more difficult as the layer of the semiconductor used becomes thinner, for example for thin SOI films (in particular less than a few 100 nm).

Therefore, the problem arises of finding a new structure for a device to solve these problems.

PRESENTATION OF THE INVENTION

The invention solves these problems.

Firstly, it uses detection by one or several transistors, instead of a capacitive detection usually used for accelerometers in a plane.

The invention relates to a detection device using at least one transistor with a vertical channel comprising a mass or a mechanical structure, this mechanical structure and the transistor being free to move relative to each other in a plane containing the drain, source and channel of the transistor.

At least one transistor is formed firstly from a gate and secondly a conducting element comprising a source and a drain connected together by a semiconductor. This transistor is connected through the gate or the conducting element to a mechanical structure. The gate and the conducting element are free to move relative to each other, one being fixed and the other being connected to a mobile mechanical structure.

The gate(s) may be fixed, and the mechanical structure may be mobile. Or the gate(s) may be mobile and the mechanical structure may be fixed.

The transistor and the mechanical structure contain at least one common plane, or are in the same plane called the principal plane of the device.

The conducting element of the transistor and the gate are arranged facing each other such that the conducting direction between the source and the drain are contained in the principal plane. Facing surfaces of the conducting element and the gate define planes approximately perpendicular to the principal plane.

The principal plane of a device according to the invention may for example be defined by the upper surface of the substrate from which the transistor and the mechanical structure are made. This implementation may be the result of a set of deposit and etching steps. This principal plane passes through the drain, the source and the gate of the transistor.

A vertical channel means that the plane of the channel is perpendicular to the principal plane of the device or to the plane of the substrate in which the device is made. The current propagation direction between the source and the drain in the channel is contained in the principal plane or in the plane of this substrate.

According to one definition, the invention relates to a detection device comprising at least one transistor formed firstly by a gate, and secondly by a conducting element comprising a source and a drain connected through a semiconductor forming a vertical channel, in the sense that the surfaces facing the conducting element and the gate element define planes approximately perpendicular to a plane called the principal plane of the device, passing through the transistor drain, the source and the gate, the current propagation direction in the channel between the source and the drain being contained in this principal plane, the gate and the conducting element being capable of moving relative to each other. One may be fixed and the other may be connected to a mechanical structure free to move in the principal plane.

A detection process according to the invention uses a detection device like that described above.

Therefore, the invention proposes a device and a method of detection by transistor with a vertical channel and manufacturing of the mechanical structure in the same plane, for example the plane of a semiconducting layer used for manufacturing the transistor and any co-integrated IC circuits. This layer may be the surface layer of an SOI substrate.

The mobile mechanical structure (including either the transistor or the gate) may be non-resonant or resonant.

Due to the displacement in a plane, the invention can be used to make differential detections. It is thus possible in particular to overcome temperature problems.

The mechanical structure may cause a relative displacement of the gate relative to the conducting element so as to vary the electrical capacitance defined by facing surfaces, leading to a modification of the output current Ids from the transistor in amplitude and/or in frequency.

The movement of the gate relative to the conducting element may be a variation of the distance separating the facing surfaces, or a variation of facing surfaces following a relative displacement in a plane that may be parallel or possibly perpendicular to the principal plane.

A method and device according to the invention are used to detect any physical phenomenon that could lead to a movement variation (or displacement) of the mechanical structure (variation of mass, acceleration) or impose an adapted movement to the mechanical structure, to obtain an appropriate output signal from the transistor. It may operate in open loop (by recovery of the signal at the output from the device) or in closed loop, for example by reinjection by slaving of the device output signal, particularly using electrostatic forces, for example to neutralise the movement.

A device according to the invention may comprise several transistors associated with a single mechanical structure, so as to optimise its characteristics (sensitivity, pass band, resolution). In particular, these transistors may be combined to obtain information about the movement along several directions or to obtain a differential detection or to amplify detected information or to reduce the influence of parasite information (for example for an actuator). Thus, by using 2 or 3 transistors, 2D or 3D displacements can be detected with a single component.

A transistor in a device according to the invention may have several operating modes depending on its physical characteristics (dimensions, doping, etc.) and/or its polarisation voltages (for example gate/source and/or drain/source). In particular, the transistor can operate according to a so-called "low inversion" condition to give priority to linearity of the output signal, or "high inversion" to give priority to the amplitude of the output signal.

DETAILED PRESENTATION OF PARTICULAR EMBODIMENTS

Figure 1A:
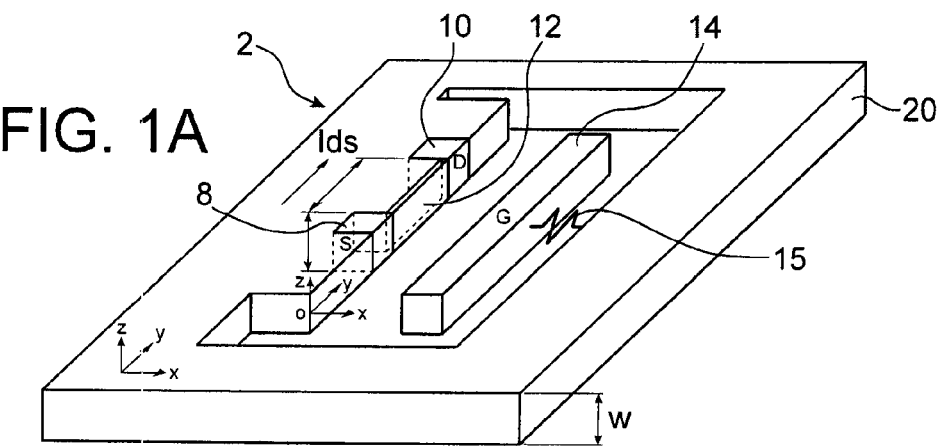
FIGS. 1A, 1B show variants of a first embodiment of the invention.

FIG. 1A shows a device according to the invention.

It comprises at least one FET type transistor structure 2 (for example a MOSFET), comprising a conducting element (a source 8 and a drain 10 separated by an element or a channel 12, made of a semiconducting material) and a gate 14, and at least one MEMS or NEMS type mechanical structure, these two structures being made in the same thin layer 20, for example the surface silicon layer of an SOI substrate, and being mobile with respect to each other.

In the remainder of this description, the gate, channel, drain and source will be denoted by the letters G, C, D and S respectively.

One of the 2 transistor elements (conducting element comprising the channel 12 or the gate 14) is connected to the mobile structure. In other words, the MEMS structure comprises an element acting as the gate 14 of the transistor. The mobile structure can also be connected to the substrate through means 15, for example forming an elastic connection. In particular, this is the case in FIG. 1A in which the gate is connected to the substrate through an elastic connection 15.

The transistor is called the "vertical transistor"; the plane of the conducting channel 12 between the source 8 and the drain 10 (plane yOz in FIG. 1A) is perpendicular to the plane of the chip (plane xOy in the figure). It could also be said that the mechanical structure and the electrical structure are made between two planes approximately parallel to each other and parallel to the plane of the substrate or to the principal plane. The layer 20 is located between these two planes parallel to each other.

The width and length of the channel 12 are given by w and l respectively. For example, w is the thickness of the layer 20 in which the mobile mechanical structure is made. This may be the thickness of the surface silicon of a thin SOI substrate. The transistor and each of the transistors described in the following may be of the n or p type.

The 2 structures (transistor and MEMS) are free to move with respect to each other, a displacement inducing a variation of the capacitance Cgc between the gate 14 and the channel 12. This results in a variation of the transistor output current Ids. Relations between the output current and the mechanical movement are known, for example in the article by Abélé already mentioned in the introduction.

The MEMS structure 14 can be displaced along 3 directions x, y or z. For a displacement along x, the variation of the capacitance is due to a variation of the air gap between the two electrodes composed of the channel 12 and the gate 14. In the case of a displacement along y or z, the capacitance variation is due to a variation in the surface facing each of the 2 electrodes 12, 14 composed of the channel and the gate.

There can be a fixed transistor structure and a mobile gate 14 (connected to the MEMS), or the reverse, in other words a fixed gate 14 and a mobile transistor structure (connected to the MEMS).

The presence of a gap between the conducting element 12 and the gate 14 moves the gate electrically further from the channel, and therefore deteriorates control of the transistor through the gate and limits the sensitivity of the device to mechanical movement.

Figure 1B:
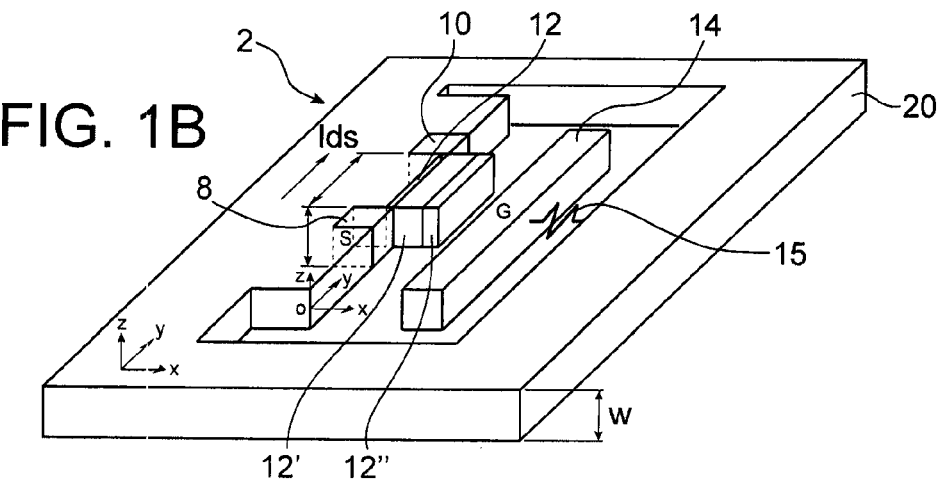

As shown in FIG. 1B, a solid gate oxide 12' and another material 12" (for example silicon or metal) can be added onto the surface of the channel 12 of the conducting element to act as the gate of the transistor (Gf), in order to optimise operation of the device according to the invention. This gate is said to be floating, in other words it is left at a floating potential during operation; thus the transistor channel is created by applying the voltage VGS between the gate 14 and the source 8, the presence of this floating gate Gf possibly improving the electrostatic control of the transistor.

A device according to the invention can be made on thin SOI substrates; the thickness w of the layer 20 that then forms the surface layer of an SOI substrate is less than 1 µm, for example between 100 nm and 500 nm. "SON" type technologies (for example SiGe film used as a sacrificial layer) can also be used.

A device according to the invention can be applied to manufacturing of a transistor detection accelerometer with its sensitive axis in the yox plane (FIG. 1A).

Figure 2:
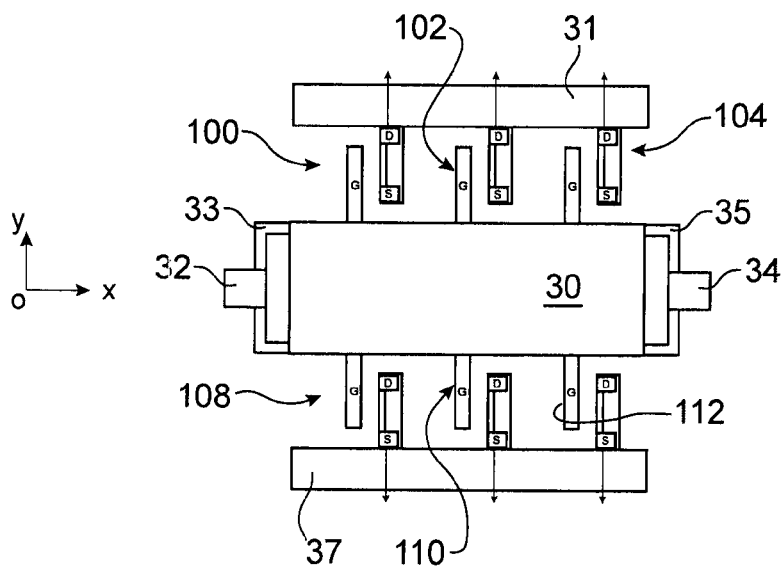
FIGS. 2 and 3 show a non resonant accelerometer and a resonant accelerometer respectively, according to the invention.
Figure 3:
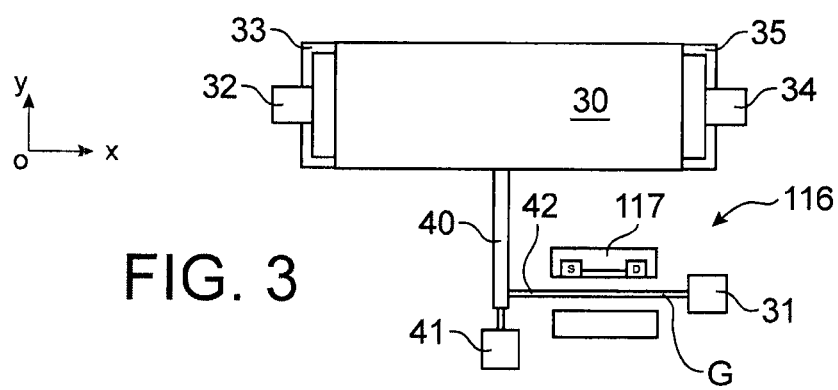

FIGS. 2 and 3 show two transistor detection accelerometer structures according to the invention, with non-resonant and resonant structures respectively. In these two figures, the references 32 and 34 each denote a pad or a fixed reference point connected to the mobile mass 30 through at least one arm or beam 33, 35, flexible in the plane of the figure.

In the case of the non-resonant structure (FIG. 2), acceleration causes displacement of mass 30 to which the gates G of a plurality of transistors 100, 102, 104, 108, 110, 112, approximately parallel to each other, are connected. The variation of the distance between each gate G and the channel corresponding to the transistors modifies the output current from these transistors. To achieve this, the transistors are naturally polarised as a function of the required operation, particularly by applying a voltage Vgs between the gate and the source so as to create the channel, and a voltage Vds between the source and the drain so as to create a current Idk or Id'k (k=1, 2, 3). Therefore, detection takes place following the amplitude variations ΔIdk or ΔId'k of the output current from each transistor or a signal created from information from each of these transistors, for example sum or the average of the currents. In this embodiment, a comb (formed by the gates G) is fixed to the mass 30, and is therefore free to move with it. A fixed comb 31, 37 is placed on each side of the mobile mass 30. The mobile mass 30 moves relative to this fixed comb to which transistors 100, 102, 104, 108, 110, 112 are attached, and therefore equally each of the gates G. More generally, a device according to the invention comprises:

at least one mobile mass or mobile structure connected to a fixed part by means allowing a displacement of the mobile mass or the mobile structure relative to the fixed part, and at least one comb with at least two teeth, this comb comprising a gate on each mobile tooth, and a source and a drain separated by a channel on each fixed tooth.

In the case of the resonant structure (FIG. 3), the acceleration causes displacement of the mass 30 in the xOy plane along the x direction, and through the connecting means 40, stressing of the mechanical structure 42 forming the resonator. The reference 41 denotes a fixed pad on the substrate. The resonant frequency of the resonator depends on the mechanical stress applied to it, and therefore the acceleration. Movements of this resonator are controlled by an actuator, for example an electrostatic actuator, and its displacements are detected by a "vertical transistor" 116 according to the invention, with a mobile gate G facing the source-channel-drain assembly 117 as shown in FIG. 1A.

The transistors are polarised depending on the required operation, particularly by applying a voltage Vgs between the gate and the source so as to create the channel, and a voltage Vds between the source and the drain so as to create the current Ids. Therefore, detection occurs following frequency variations of the transistor output current.

The accelerometer described comprises a mobile mass 30 suspended by flexible beams 33, 35 and that can move in the plane of the chip, and at least one structure 100, 102, 104, 106, 108, 110, 112 (FIG. 2), 116 (FIG. 3) of one or several transistors, each of which is vertical facing a gate G that is connected to the mobile mass 30. These structures are connected in the same plane and advantageously in the same thin film, for example the surface silicon film of an SOI substrate.

The total output current It from the sensor can also be increased by forming a comb structure with n transistors and summating the output currents Ids from the various transistors; the total output current from the sensor is then $It=n.Ids=n.(Id0+\Delta Id0)$, where n is the number of transistors, Id0 is the output current from one of the transistors before displacement of the mass 30, and $\Delta Id0$ is the variation of the output current from one of the transistors due to displacement of the mass 30 following an acceleration. FIG. 2 shows an example of a structure operating on this principle. This principle can also be used in the case of structures allowing a differential detection (FIGS. 4A, 4B, 5).

Figure 4A:
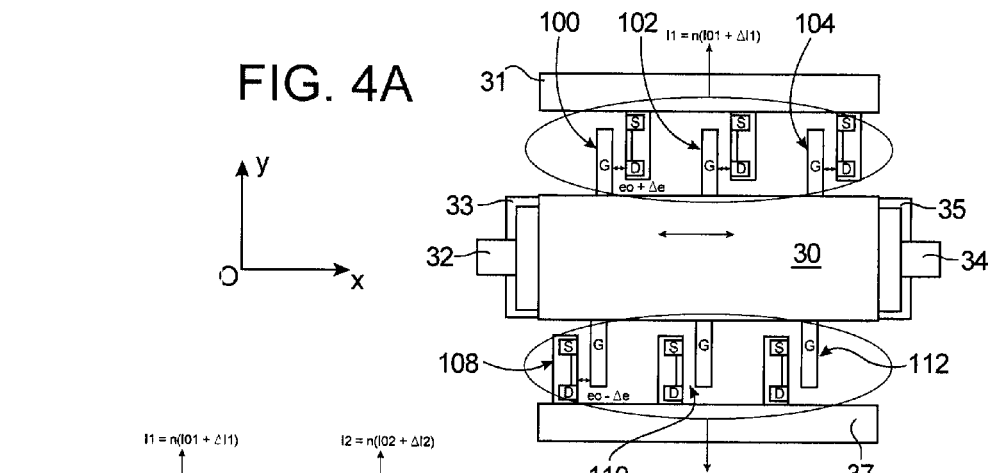
FIGS. 4A, 4B and 5 show various configurations of devices according to the invention to enable a differential detection.
Figure 4B:
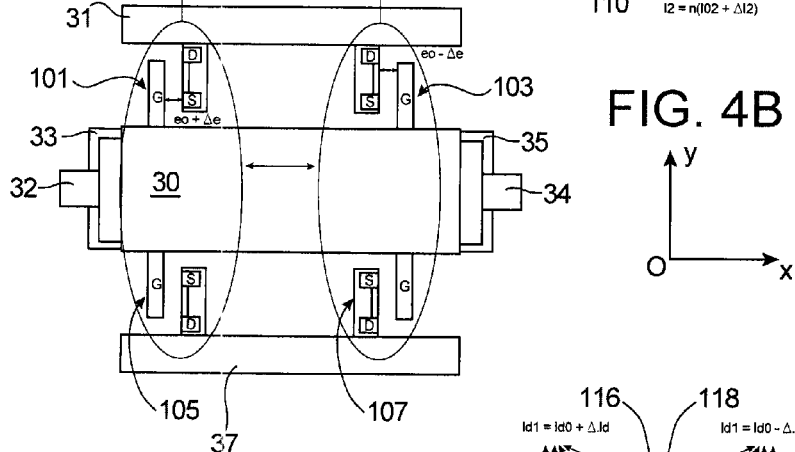
Figure 5:
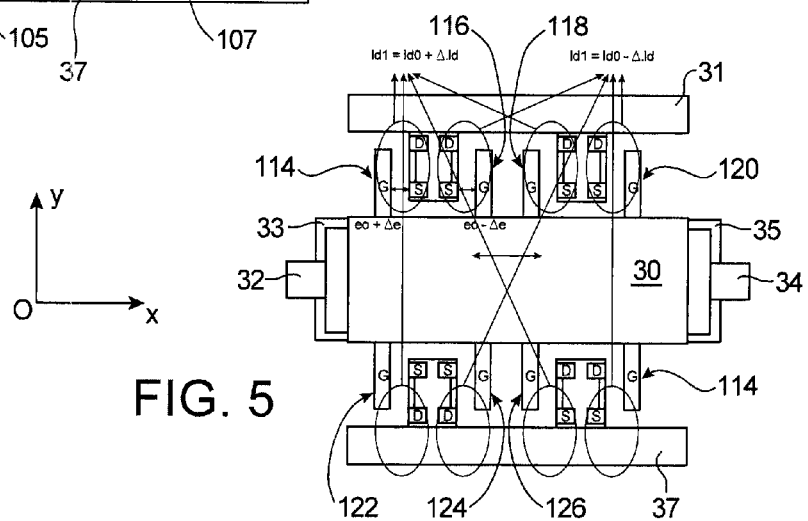

In order to eliminate problems related to temperature effects, configurations allowing a differential detection may be applied with this approach as shown in the example in FIGS. 4A and 4B on which references 30-35, 100-112 denote elements identical or similar to those shown in FIG. 2. The transistors in FIG. 4B are denoted by references 101, 103, 105, 107. In differential detection, the output from the sensor is $It=I_1-I_2$. In the special case in which the transistors are of the same type for combs 1 and 2, we have:

a) $I_1=n.(I_{01}+\Delta I_1)$ is the total output current from the transistors in one of the combs, b) $I_2=n.(I_{02}-\Delta I_2)$ is the total output current from the transistors in the other comb, In these formulas:

n is the number of transistors on each comb; in FIG. 4A, n=3, $I_{01}$ and $I_{02}$ are the currents between the source and drain of a transistor in the rest position of comb 1 or comb 2 respectively, $\Delta I_1$ and $\Delta I_2$ are the current variation between the source and drain of a transistor of comb 1 and comb 2 respectively, consecutive to a displacement of the mass 30.

In this configuration, the result is $\Delta I_1=\Delta I_2$.

In FIGS. 4A and 4B, two detection sets E1 and E2 located on each side of a mobile structure are used to create currents $I_1$ and $I_2$ respectively. Each detection set comprises combs, and each tooth of the combs comprises detection means. Similarly, the mobile structure comprises two combs, the teeth of which are arranged facing the teeth of the combs of the detection sets E1 and E2. The difference between the two sets E1 and E2 is the opposite position of the fixed and mobile teeth, such that a displacement of the mobile structure along the Ox axis on one of the sets E1 and E2 reduces the gap between the gate and the conducting element, while on the other set the gap is increased by the same amplitude.

The difference between FIGS. 4A and 4B is the position of E1 and E2 relative to the mobile structure.

In FIG. 4A, the teeth of one fixed set are on the same side of the mobile teeth:

for E1, sets 100, 102, 104 successively form 3 (or more generally n) fixed-tooth mobile-tooth subsets in this order along the Ox axis, for E2, sets 108, 110, 112 successively form 3 (or more generally n) fixed-tooth mobile-tooth subsets in this order along the Ox axis.

In FIG. 4B, the teeth of a single fixed set alternate relative to the mobile teeth:

for E1, sets 101, 103 form 2 (or more generally n) mobile-tooth fixed-tooth then fixed-tooth mobile-tooth subsets, in this order along the Ox axis, pour E2, sets 105, 107 also form 2 (or more generally n) mobile-tooth fixed-tooth then fixed-tooth mobile-tooth subsets, in this order along the Ox axis.

If the first and the second configuration transistors are identical with the same air gap (gate-channel distance):

$I_1=n.(I_0+\Delta I)$ $I_2=n.(I_0-\Delta I)$;

then the output current becomes $It=2.n.\Delta I$, where $\Delta I$ is the current variation induced at a transistor by displacement of the mass following an acceleration.

FIG. 5 is another configuration allowing a differential detection, the transistors 114, 122, 126, 118 each supplying a signal $Id1=Id0+\Delta Id$, the transistors 116, 124, 120, 128 each supplying a signal $Id2=Id0-\Delta Id$. A combination of these different signals leads to a signal equal to 2nId0, where n is the number of transistor pairs on the same tooth, for example n=4 in FIG. 5.

In the structures shown, the head-foot arrangements of transistor pairs are used to make differential measurements; we then have alternately, along a single axis (displacement axis Ox of the mobile mass in FIGS. 4B and 5), and in this order, a first gate, a first drain-channel-source set, a second drain-channel-source set, a second gate, or a first drain-channel-source set, a first gate, a second gate, and a second drain-channel-source set This approach also provides a means of making structures operating in a closed loop so as to improve the performances of the MEMS+Electronics system, particularly from the linearity point of view, by adding means (for example electrostatic means) in addition to the transistor detection means, to control the position of the mass.

Figure 6:
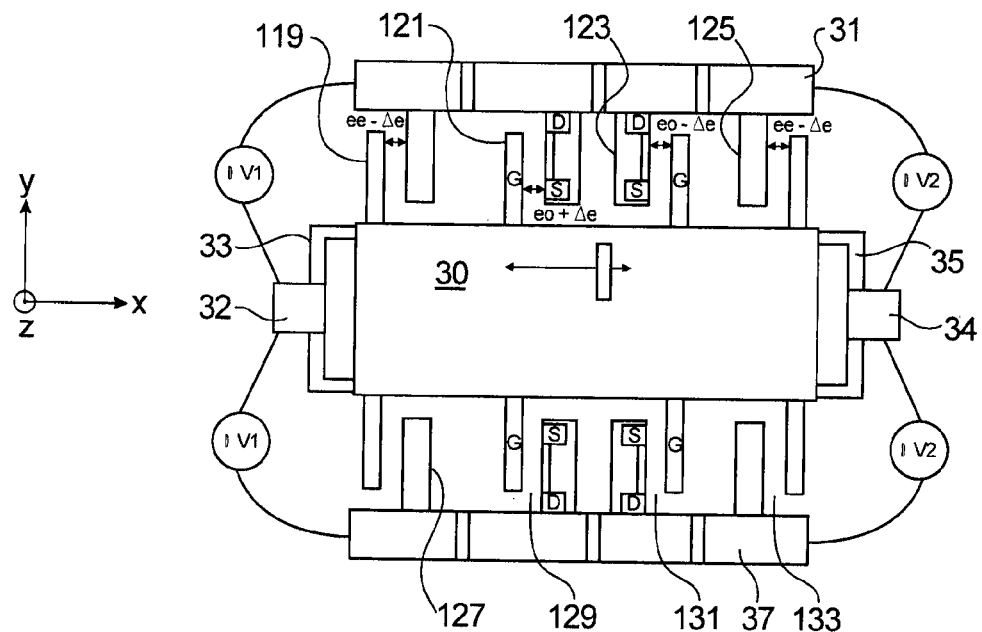
FIG. 6 shows a device according to the invention, allowing operation in differential and in closed loop, FIGS. 7 and 10 each show a device according to the invention, allowing operation for detection of movements in 2 or 3 dimensions.

The diagram in FIG. 6 shows a configuration example allowing this operation, with a part of the combs 31, 37 dedicated to detection (by transistors 121, 123, 129, 131) and a part of these same combs dedicated to actuation (by electrostatic force for counter-reaction) by means of electrode pairs 119, 127, 125, 133). Voltages $\Delta V_1$, $\Delta V_2$, are set up between the pads 32, 34, electrically connected to the mobile electrodes through flexible beams, and the fixed combs 31, 37 respectively.

The part dedicated to detection comprises transistors 121, 123, 129, 131 arranged head-foot to enable differential detection along the x direction. The transistors are polarised as a function of the required operation, a voltage Vgs between the gate G and the source being used to form the channel and a voltage Vds between the drain and the source being used for circulation of current in the transistor which is controlled by the distance between the gate and the channel.

The actuation part is composed of electrode pairs 119, 127, 125, 133 or electrostatic combs that can create an electrostatic force opposing displacement of the mass under the effect of the acceleration. For example, a displacement of the mobile mass following an acceleration in the direction x>0 will induce a variation of the current Ids detected by the detection transistors. Application of a voltage $\Delta V_1$ on the system of electrode pairs 119, 127 counteracts the displacement and returns the mobile mass 30 to its original position. Similarly, application of a voltage $\Delta V_2$ on the system of electrostatic combs 125, 133 brings the mobile mass back to its original position after a displacement detected in the direction x<0.

Figure 7:
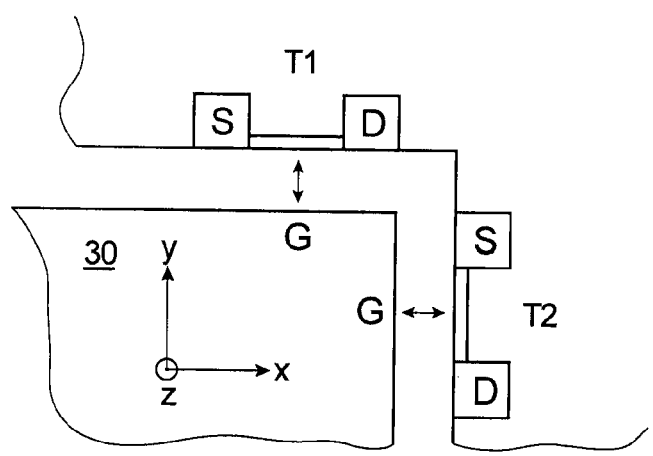

Several transistors T1, T2 can be used for 2D or 3D detection of displacements of a mechanical structure, as shown in FIG. 7. In this case, a displacement of a mobile mass 30 along x is detected particularly by a variation in the air gap at the transistor T2, a displacement along y is detected particularly by a variation in the air gap at transistor T1, a displacement along z is detected by variations in surfaces at transistors T1 and/or T2.

Examples of two additional differential schemes for 2D detection will be given with reference to FIGS. 8A-8B and 9.

In both cases, the system is divided into 4 parts.

Figure 8A:
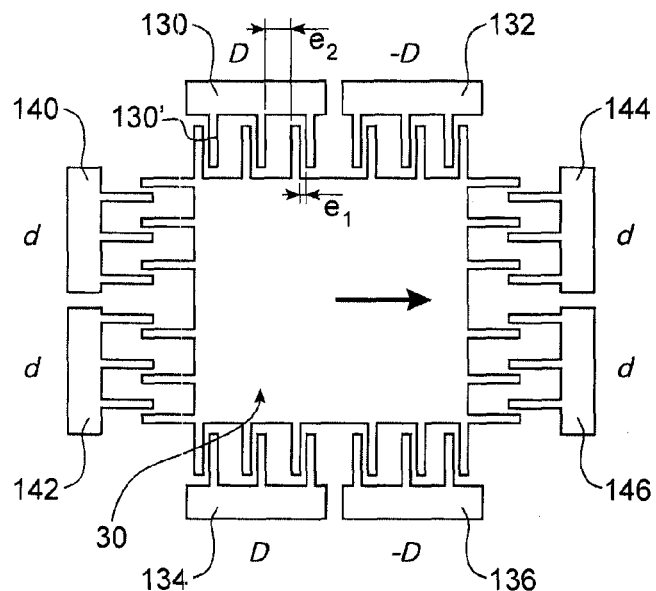
FIGS. 8A, 8B and 9 show a device according to the invention, allowing operation in differential with alternate gaps and different types of transistors respectively.

The first case (FIG. 8A) uses eight sets or stages 130, 132, 134, 136, 140, 142, 144, 146 arranged around the mobile mass 30 which in the example shown in FIG. 8A is square or rectangular in the xOy plane. Each stage is composed of a set of inter-digitised combs, in which the fingers not connected to mass 30 comprise transistor source, drain and channel while the fingers connected to the mass comprise the transistor gates. A gap e1 separates these two fingers, while a gap e2 separates two elements making up the inter-digitised comb. Advantageously, e2 is greater than e1.

Stages 132 and 136 are identical to each other, and they have a gap e1 alternating with respect to gap e2 of stages 130, 134, such that a displacement of the mass 30 along the Ox axis will vary the current $+\Delta I$ on stages 130 and 134 consecutive to an increase in the gap e1 and a current variation $-\Delta I$ on stages 132 and 136 following a reduction in the gap e1.

The same is true for stages 140 and 144 compared with stages 142 and 146.

All transistors used for detection are then of the same type.

Figure 8B:
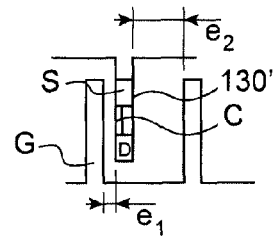

FIG. 8B more precisely shows the structure of a finger 130' of the device in FIG. 8A. This FIG. 8B clearly shows the arrangement of the drain D, the channel C and the source S, all facing the gate G. The other fingers have an identical or similar structure.

The second case (FIG. 9), uses various types of transistors for the various parts. The arrangement of the drain, gate, source elements of the transistors is identical to the arrangement described with reference to FIG. 8A, in other words these elements are also arranged on the fingers of the inter-digitised combs. Preferably, each finger also has the configuration described with reference to FIG. 8B.

Eight sets or stages 131, 133, 135, 137, 141, 143, 145, 147 are arranged around the mobile mass 30, once again approximately square or rectangular in the example given. Similarly, stages 141-145-143-147 are identical to each other in terms of gaps, but they are different in the nature of the transistors; type N on 141 and 145 and type P on 143 and 147.

If an acceleration $\gamma_x$ occurs in the plane along the Ox axis, current variations induced by displacement of the mass in FIG. 8 are $\Delta I$ for stages 130 and 134. This variation is related to a gap variation.

This variation is $-\Delta I$ for each of stages 132 and 136.

A global current variation is obtained by working in differential:

(variation of 130)+(variation of 134)−(variation of 132)−(variation of 136)=4$\Delta I$.

The current variation $\delta I$ for stages 140, 142, 144, 146 will remain low, particularly if the combs cover most of the gate, source and the drain of each transistor, because the capacitance variation on these stages is due to a variation in the surface, while the capacitance variation on stages 130-132-134-136 is due to a variation in the air gap.

For stages 140 and 142, there is a current variation of $-\delta I$, and a variation of $\delta I$ for stages 144 and 146. A global variation as defined below is obtained by working in differential:

(variation of 140)+(variation of 144)−(variation of 142)−(variation of 146)=0.

Since the architecture is symmetrical, the same results will be obtained for an acceleration along Oy, denoted $\gamma_y$.

Figure 9:
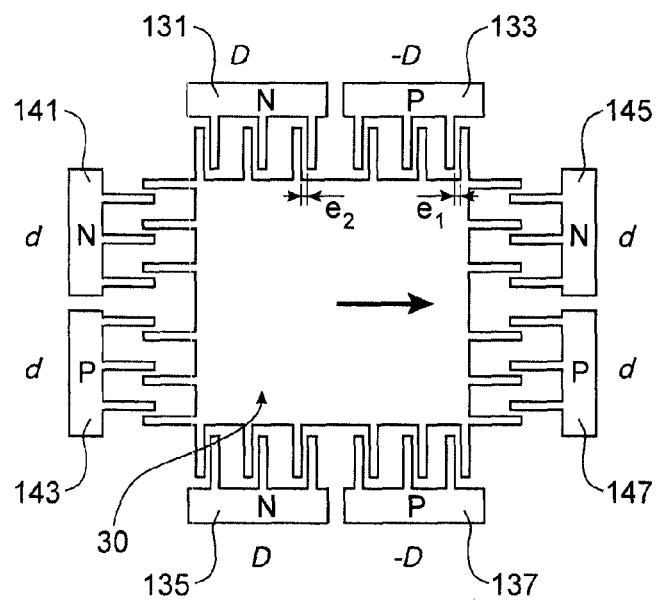

Operation of the structure described in FIG. 9 is of the same type as operation in FIGS. 8A, 8B, but is based on alternation of opposite type transistors (N and P) rather than a gap alternation with a transistor of the same type. Advantageously, the N and P transistors are determined so as to obtain an opposite current variation $\Delta I$ (between N and P) for a given gap variation e1.

Figure 10:
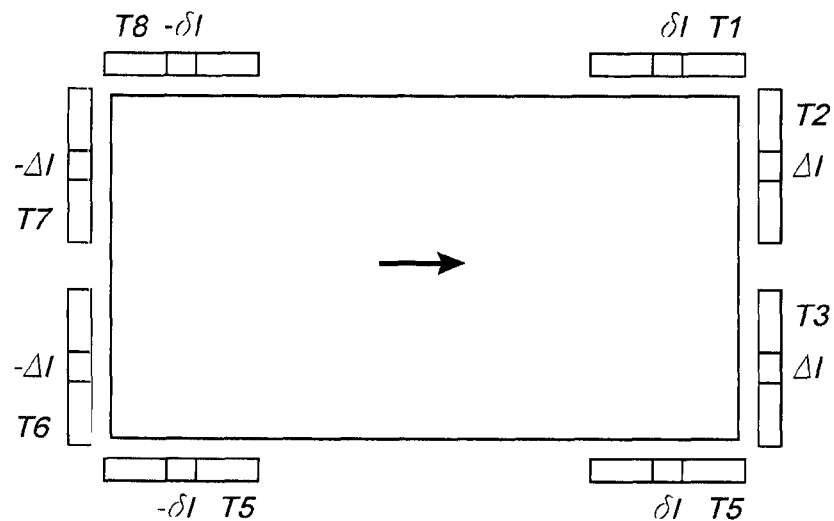

A differential system can also be produced using transistors T1-T8 placed facing the 4 corners of a seismic mass 30 as shown in FIG. 10. The reasoning is exactly the same as before. The current variations $\pm \Delta I$, $\pm \delta I$ of the different transistors induced by displacement of the mass 30 are shown in FIG. 10.

Regardless of the number of transistors used, a device according to the invention can be connected to means, for example microprocessor or microcomputer type means, for processing and/or storage of output current data from the transistor(s). For example, processing means can summate the different output currents when it is required to increase the total output current, or to take the difference between currents during a differential measurement. During operation in closed loop, these means can calculate a retroaction force to be applied to oppose displacement of the mobile mass and to send a set value to the compensation means.

A device according to any one of the embodiments of the invention advantageously has two operating modes.

According to a first mode, the mechanical structure does not move at rest (first state); but it does move under the impact of an external influence (second state).

According to a second mode, in a first state the mechanical structure is subjected to a determined displacement (for example vibration of the structure depending on its resonant frequency); this determined displacement is modified under the impact of an external influence, in particular causing a variation of the resonant frequency of the structure and therefore a second state that can then be measured by means of an output signal from the associated transistor(s).

The invention is particularly useful for accelerometers made of thin SOI wafers for the following reasons.

Manufacturing on a thin SOI substrate (particularly a few hundred nm, for example between 100 nm and 500 nm or 900 nm), requires very small facing surfaces (in the case of the capacitive approach), which even in the case of very small air gaps (50 nm-100 nm) leads to very low capacitances (of the order of fF with variations of the order of one aF to be detected). This situation makes capacitive detection difficult and limits its performances.

This type of manufacturing also enables implantation through the entire thickness of the SOI silicon (a few hundred nm), which is unthinkable for conventional MEMS structures with a thickness of several μm to a few tenths of a μm. This special feature can be used to make vertical channel transistors (perpendicular to the chip). Therefore, this channel can be parallel to the field of a mechanical structure, for example of the N-MEMS type made in the SOI silicon and moving in the plane of the substrate.

In each example of devices according to the invention and their particular manufacturing methods presented below, the device is made on a thin SOI substrate (with a solid substrate 200 and dielectric layer 201):

In the first device (FIGS. 11A and 11B), the tracks ps, pd, pg used to connect the source S, drain D and gate G of the transistor to the pads (source pad Ps, drain pad Pd, gate pad Pg) are made using the surface layer of the SOI silicon.

In the second device (FIGS. 12A and 12B), the tracks ps, pd, pg used to connect the source S, the drain D and the gate G of each transistor to the pads (source pad ps, drain pad Pd, gate pad Pg) are made of metal, for example tungsten, copper, aluminium and their alloys or an aluminium-silicon type alloy.

Figure 11A:
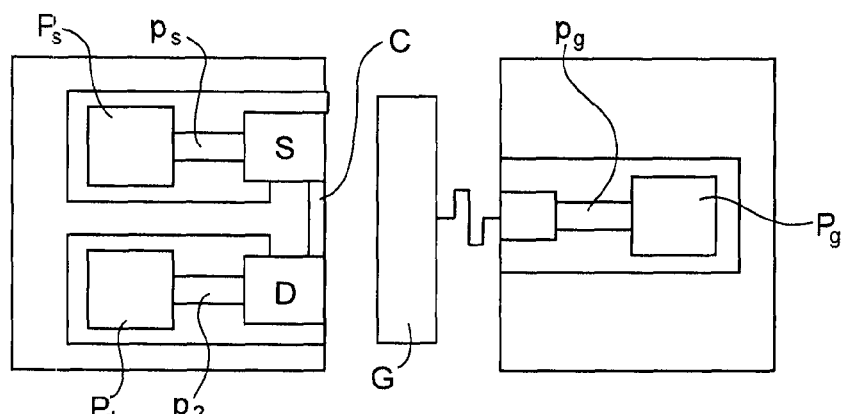
FIGS. 11A, 11B, 12A, 12B show two embodiments of a MOS type detection device according to the invention, with silicon tracks and metal tracks respectively.
Figure 11B:
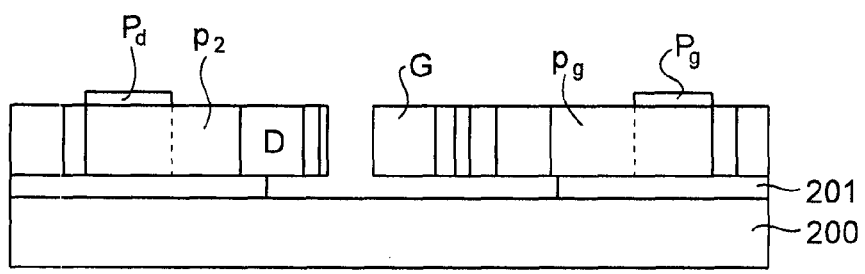

FIGS. 11A and 11B present a device according to the invention, similar to that described in FIG. 1, in the case in which the connecting tracks between the sources, drain and gate of the transistor and the pads are made using SOI silicon.

Figure 12A:
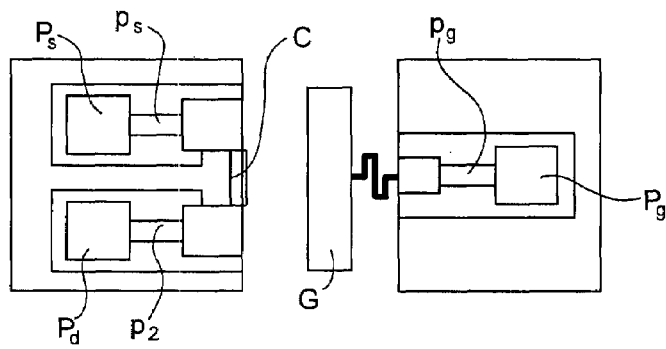
Figure 12B:
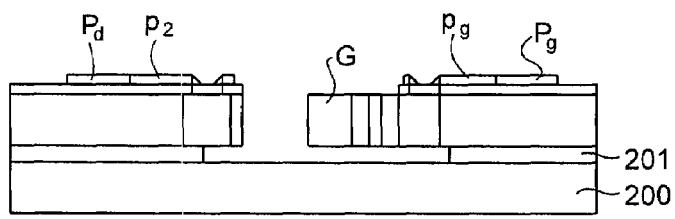

FIGS. 12A and 12B present a device according to the invention similar to that described in FIG. 1A, in the case in which the connecting tracks between the source, drain and gate of the transistor are made with a metal level. Advantageously, silicon tracks are used when the detection electronics is manufactured separately from the device according to the invention and metal pads are used when the detection electronics is made on the same substrate as the device according to the invention.

Figure 13A:
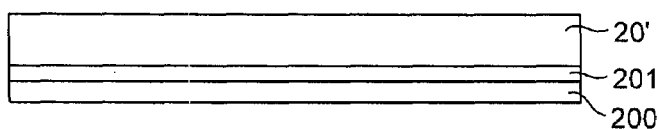
FIGS. 13A-13E show steps in manufacturing a device according to FIGS. 11A and 11B, with connections and semiconducting pads.
Figure 13B:
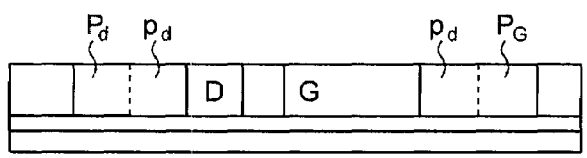
Figure 14A:
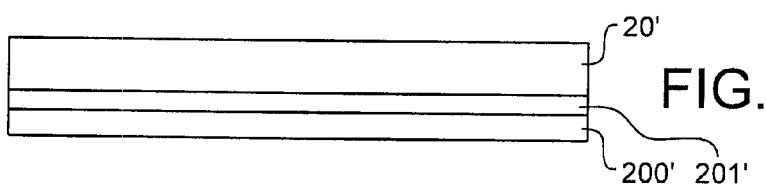
FIGS. 14A-14E show steps in manufacturing a device according to FIGS. 12A and 12B.
Figure 14B:
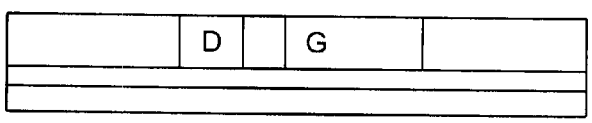

Each of the manufacturing methods illustrated uses a thin SOI substrate, for example with a thickness less than 500 nm of surface silicon 20, 20' (FIGS. 13A and 14A) on which the following steps are carried out:

Step 1—Doping of silicon in the different regions; the transistor (channel C, source S, drain D, gate G, etc.) of the mechanical structure (mobile element, elastic connection, etc.) and possibly some parts of the solid semiconducting substrate 200, 200' located under the oxide 201, 201';

In the case of FIG. 13B, doping is done at the connecting tracks to the pads (source pad ps, drain pad pd and gate pad pg) and at the pads (Ps, Pd, Pg) before they are metallized.

Figure 14C:
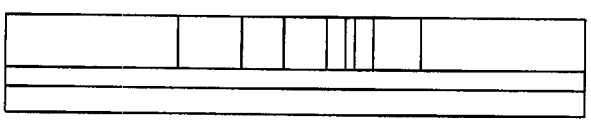
Figure 14D:
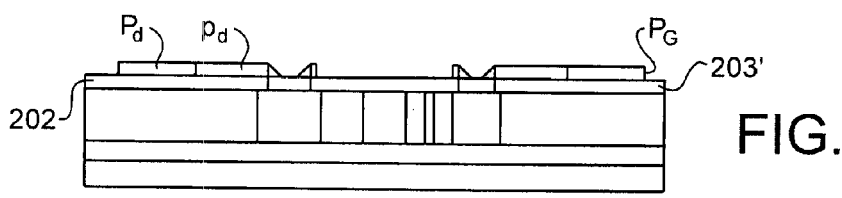
Figure 14E:
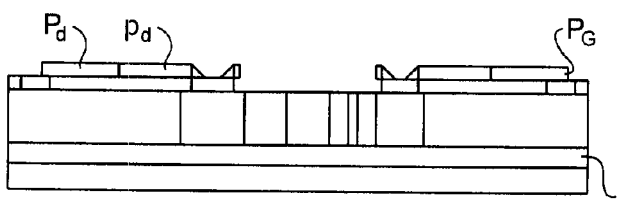

In the cases shown in FIGS. 14D, 14E, the pads and the connecting tracks are composed of metal tracks isolated from the silicon 20' by an oxide 202', 203'.

These dopings use photolithography and implantation levels.

Figure 13C:
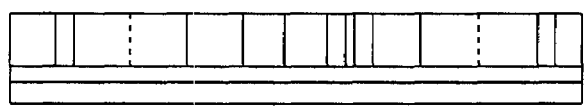

Step 2—Definition of mechanical elements and isolation of transistors if required:

In the case shown in FIG. 13C, the sources, drain and gate, but also connecting tracks and pads, are electrically isolated by etching silicon 20 around the periphery of these patterns.

In the case shown in FIG. 14C, only the mechanical elements (including the mobile gate) are made during this step. Connecting tracks and pads are isolated by local etching of the metal layer, itself deposited on an oxide layer 202', 203' (FIG. 14D).

This step uses photolithography and anisotropic etching of the silicon.

Figure 13D:
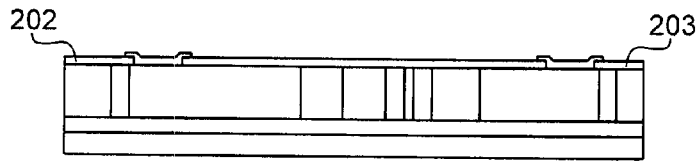

Step 3—Manufacturing of metal electrical elements (FIGS. 13D and 14D). This is done firstly by closing off the structure by an oxide layer 202, 203, 202', 203'. This oxide will also provisionally fill the zones etched during the previous steps. The next step is to open the oxide (photolithography+etching of the oxide) and the metal deposit and a photolithography step (possibly with a hard mask) and etching of the metal:

In the case shown in FIG. 13D, the metal level is used to define contact zones (connection between metal and source, drain, gate), connecting tracks and pads.

In the case shown in FIG. 14D, the metal level is used solely to metallise the pads.

Figure 13E:
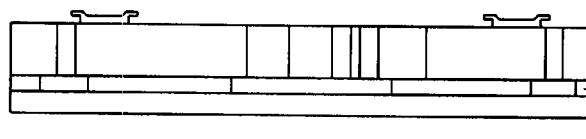

Step 4—Release the mobile mechanical structures. This step uses an isotropic etching of the oxide 201, 201' of the SOI substrate (FIGS. 13E and 14E).

In both cases, the transistor may be made in all or in part of the SOI thickness (implantations defining the channel, source, drain, gate, etc.). The isolating part included between the channel and the gate is composed of the medium filling the gap made by etching, for example the vacuum, air or another gas or even a liquid. A solid gate oxide may possibly be added to the channel surface (for example by thermal oxidation or deposit of an oxide) to improve the transistor performances.

The metallization of the pads (and possibly connecting pads and contacts) is resistant to the mechanical structure release method, for example AlSi or AlCu if a vapour HF etching is used for release.

The gate oxide may be made between steps 2 and 3 of the method described above and the floating gate Gf may be made during step 3, to make a floating gate as explained with reference to FIG. 1B.

With the invention, a MEMS can be miniaturised to dimensions of the order of a few nanometers (NEMS), by making the device (transistor and mobile mass) in a substrate or a thin layer (for example with a thickness of between 10 nm or 50 nm and a few hundred nm, for example 500 nm or 900 nm), while making it possible to detect movement of the mechanical structure by the transistor.

Furthermore, the invention very much facilitates co-integration <<in IC>>, because the thin layer used for manufacturing MEMS-NEMS may be the same as that used for manufacturing the transistor and possibly an integrated circuit (IC).

The invention also makes it possible to use a very good quality mechanical layer (for example mono-crystalline silicon), particularly if work is done with SOI substrates or a "SON" type method.

Industrial applications of the invention can be addressed by MEMS-NEMS components, with a special advantage for sectors requiring low cost components without necessarily having very high performances and applications that absolutely require MEMS-IC co-integration.

Another field worth mentioning is sensors (acceleration, gyrometer, etc.), resonators (mobile telephony, etc.).

For example, the mechanical structure is an accelerometer comprising at least one fixed element and at least one mobile element associated with one or several transistors. For each transistor, the gate or the conducting element is mechanically connected to the mobile element while the conducting element or the gate is connected to the fixed element of the mechanical structure.

A device according to the invention operates quite differently from a device using a SET. The SET operates based on Coulomb Blocking and a Tunnel effect, and imposes the existence of a conducting island (electron storage by Coulomb Blocking, metal or polymer conducting material) separated from source and drain zones by tunnel junctions. Therefore the conducting path located between the source and the drain is composed of a conducting island and 2 tunnel junctions instead of a continuous semiconducting element as is found in a FET transistor. The electrical current is obtained by displacement of one or several electrons by tunnel effect (discretisation of the current) instead of a continuous flux of carriers (electrons or holes) in a FET.

The choice of using a SET in these structures makes it necessary to use very small dimensions (quantum dots of the order of magnitude of a few nm, distance between resonant NEMS and island a few tens of nm) to enable quantification of phenomena that make electron by electron conduction feasible. Similarly, the thicknesses of materials from which these structures are made are small and for example not very compatible with manufacturing of inertial MEMS.

The invention claimed is:

1. Detection device made from a substrate having an upper surface that defines or is parallel to a principal plane of the device, this device comprising at least one transistor formed firstly from a gate and secondly a conducting element comprising a source and a drain connected together by a semiconductor forming a vertical channel, in the sense that each of respective surfaces of the conducting element and of the gate facing each other defines respective planes approximately parallel to each other and also approximately perpendicular to the principal plane of the device, wherein the principal plane passes through the transistor drain, the source, the channel and the gate, and this principal plane being approximately parallel to said substrate, the current propagation direction in the channel between the source and the drain being contained in this principal plane, the gate and the conducting element being capable of moving relative to each other, one being fixed and the other being connected to a mechanical structure, free to move in the principal plane, wherein the source and the drain are located in a same layer of the device as viewed from a top view, and wherein said same layer contains the principal plane such that the principal plane is defined by said same layer.

2. Device according to claim 1, also comprising a floating gate on the channel.

3. Device according to claim 1, the mechanical structure comprising the transistor gate or being connected to this gate.

4. Device according to claim 1, said at least one transistor being fixed and the mechanical structure being mobile.

5. Device according to claim 1, said at least one transistor being mobile, and the mechanical structure being fixed.

6. Device according to claim 1, the mechanical structure and said at least one transistor forming a resonant structure.

7. Device according to claim 1, said at least one transistor operating in low inversion or in high inversion.

8. Device according to claim 1, comprising several transistors.

9. Device according to claim 8, said several transistors forming a differential structure.

10. Device according to claim 8, said several transistors forming a structure operating in closed loop.

11. Device according to claim 8 comprising several transistors arranged so as to detect displacements in 2 dimensions or in 3 dimensions.

12. Device according to claim 11, said several transistors being identical, with alternate gaps, and arranged around the mobile mass.

13. Device according to claim 11, said several transistors being alternately arranged N then P around the mobile mass.

14. Device according to claim 8, the gate of each transistor being fixed to the mobile mechanical structure, the set of gates being arranged in the form of a comb on at least one side of the mobile mechanical structure.

15. Device according to claim 14, the channel, the drain and the source of each transistor being arranged facing a gate, the set of channels, drains and sources forming at least one comb.

16. Device according to claim 1, also comprising means of detecting a signal originating from said at least one transistor.

17. Device according to claim 16, the means of detecting a signal being made on the same substrate as the detection device, wherein respective connecting tracks for each of the transistor source, drain and gate are made of metal.

18. Device according to claim 16, the means of detecting a signal not being made on the same substrate as the detection device, wherein respective connecting tracks for each of the transistor source, drain and gate are made of silicon.

19. Method of manufacturing a detection device according to claim 1, comprising the step of forming the transistor mechanical structure, the drain, the source, the channel and the gate in the same plane or in the same layer, containing the principal plane of the device.

20. Method according to claim 19, the plane or the layer being defined by the surface layer of an SOI substrate.

* * * * *